United States Patent [19]

Poe

[11] 4,168,080

[45] Sep. 18, 1979

[54] BICYCLE MOUNTED SCRAPER FOR DISLODGING DEBRIS FROM A TIRE

[76] Inventor: Michael E. Poe, 815 NE. Woodcrest, Corvallis, Oreg. 97330

[21] Appl. No.: 880,968

[22] Filed: Feb. 24, 1978

[51] Int. Cl.$^2$ ............................................. B60S 1/68
[52] U.S. Cl. ................................................ 280/158.1
[58] Field of Search ............ 280/158.1, 158 R, 289 R, 280/289 H; 248/205 A

[56] References Cited

U.S. PATENT DOCUMENTS

| 2,617,663 | 11/1952 | Carlton | 280/158 R |
| 3,300,164 | 1/1967 | Welles | 248/205 A |

FOREIGN PATENT DOCUMENTS

| 329160 | 11/1919 | Fed. Rep. of Germany | 280/158.1 |
| 612736 | 10/1931 | Fed. Rep. of Germany | 280/158.1 |
| 598388 | 12/1925 | France | 280/158.1 |
| 630522 | 12/1927 | France | 280/158.1 |
| 631805 | 12/1927 | France | 280/158.1 |

Primary Examiner—John A. Pekar
Attorney, Agent, or Firm—Kolisch, Hartwell, Dickinson & Stuart

[57] ABSTRACT

A scraper for dislodging accumulated debris from a bicycle tire includes a unitary blade and mounting member, the mounting member being detachably secured to a frame member of a bicycle for positioning an edge of the blade adjacent a portion of the outer tire circumference. The scraper is mounted by means of adhesive material which is positioned on the mounting member.

9 Claims, 6 Drawing Figures

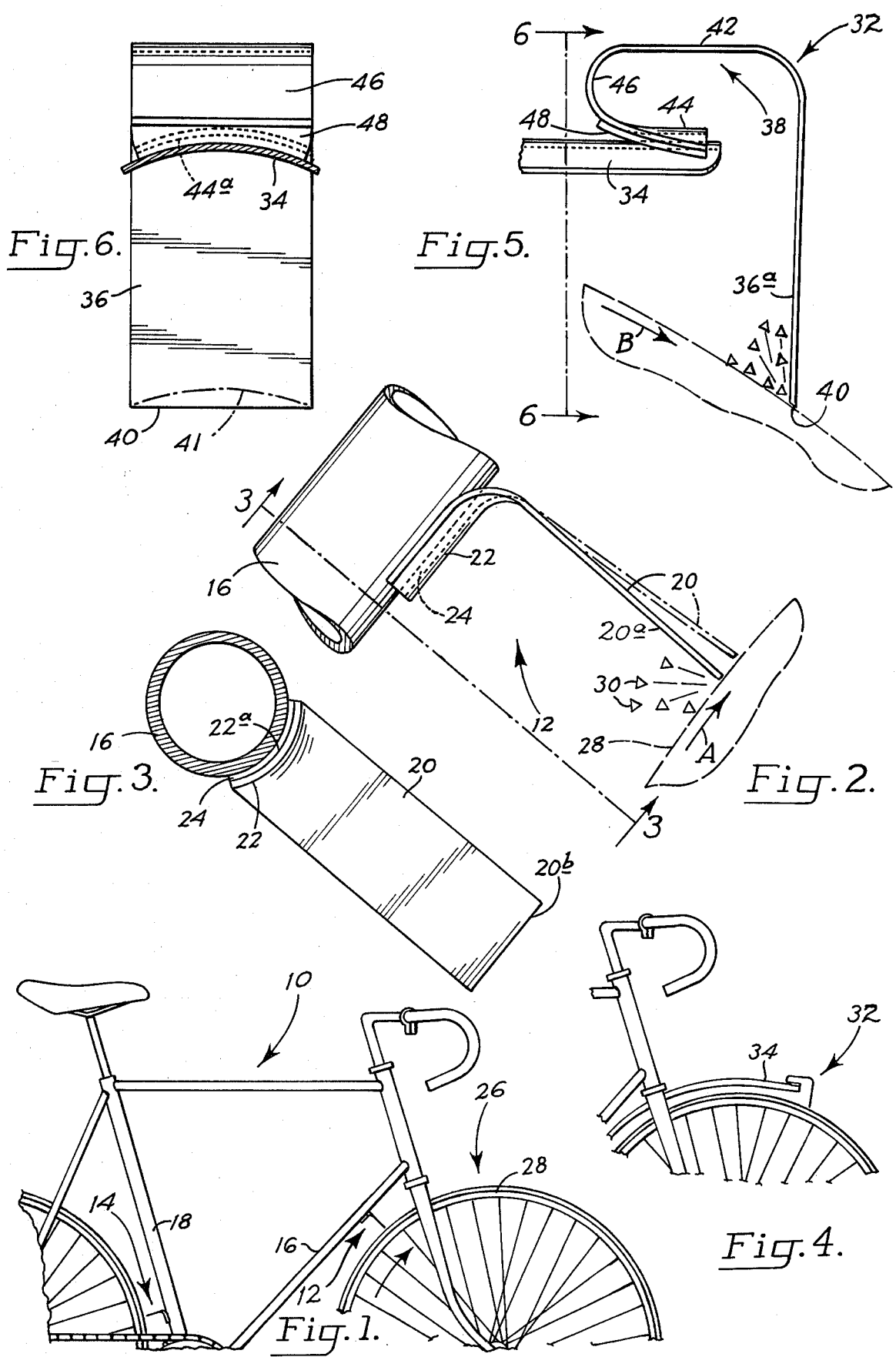

BICYCLE MOUNTED SCRAPER FOR DISLODGING DEBRIS FROM A TIRE

BACKGROUND AND SUMMARY OF THE INVENTION

The present invention relates to bicycles, and more particularly to a novel guard or scraper for dislodging debris which has accumulated on the tires of a bicycle.

Modern bicycles are designed for speed, and are generally built with a lightweight frame and wheel construction. The wheels may include thin-walled tires mounted on lightweight rims. While the overall lightweight construction enhances speed and handling of the bicycle, the lightweight tire construction is particularly susceptible to road damage.

Specifically, lightweight tires may accumulate debris such as glass fragments, nails, sharp rocks, etc. within the grooves of the tire. It may take only a single revolution of the tire for the debris to penetrate the tire's thickness and cause a puncture. The relatively thin-walled construction of modern bicycle tires combined with the relatively fast riding speed make punctures not only inevitable but extremely hazardous.

There have been attempts in the prior art to provide so-called mud guards for removing mud or other debris from tires of a bicycle. The mud guards generally include rather cumbersome and bulky constructions which may impede the handling and performance characteristics of a bicycle. Furthermore, prior art mud guards generally include multiple component parts which require a rather time-consuming assembly. Additionally, if it is necessary to remove a damaged mud guard, considerable effort may be required.

Accordingly, it is a general object of the present invention to provide a bicycle-mounted scraper for dislodging accumulated debris from a bicycle tire which includes a unitary blade and mounting member. The mounting member is detachabley secured to a frame member of the bicycle (such as a front or rear strut) and is positioned so that an edge of the blade member is disposed adjacent a portion of the outer circumference of the tire. Thus, upon revolution of the tire, any accumulated debris will contact the blade and be scraped therefrom.

Another object of the present invention is to provide a scraper in which the mounting member is disposed at an angle relative to the blade and includes an inner surface contoured for substantially conforming to at least a portion of the frame member's contour. Generally, this contour will be concave so that the mounting member may fit relatively flush against a cylindrical frame member. Interposed between the frame member and the concave surface is adhesive material for securing the scraper to the frame member.

Still another object of the present invention, as set forth in a second embodiment, is to provide a scraper having a unitary blade and mounting member which may be detachably secured to a fender of a bicycle. The mounting member is disposed at an angle relative to the blade and includes a surface, facing toward the tire, contoured for substantially conforming to at least a portion of the fender.

Still another object of the invention, as set forth in the second embodiment, is to provide a scraper in which the mounting member includes a first element disposed at an angle relative to the blade and a second element extending from said first element, said second element including a surface, facing toward the tire, contoured for substantially conforming to at least a portion of the fender. This construction results in a fender-mounted scraper which is somewhat more resilient than a scraper having a mounting of only a single element. Specifically, a mounting having two elements permits increased movement of the blade relative to the fender upon contact of a blade edge with debris on the tire.

These and additional objects and advantages of the present invention will become more readily apparent from a consideration of the drawings and the following detailed description of the preferred embodiments.

BRIEF DESCRIPTION OF THE DRAWINGS

FIG. 1 is a side elevation view of a typical lightweight racing bicycle showing positioning of scrapers according to the present invention;

FIG. 2 is a side elevation view, somewhat enlarged, of the scraper mounted on a front frame member of the bicycle;

FIG. 3 is a view taken along lines 3—3 of FIG. 2;

FIG. 4 is a side elevation view, similar to FIG. 1, illustrating a front portion of the bicycle with a scraper according to a second embodiment of the present invention mounted on a front fender;

FIG. 5 is an enlarged view of the scraper shown in FIG. 4; and

FIG. 6 is a view taken along lines 6—6 of FIG. 5.

DETAILED DESCRIPTION OF THE PREFERRED EMBODIMENTS

Turning now to the drawings, and referring initially to FIGS. 1 and 2, a conventional modern racing bicycle is generally indicated at 10. Bicycle 10 is of lightweight construction and is provided with a pair of scrapers generally indicated at 12, 14 mounted on front and rear strut or frame members 16, 18 respectively. Each of the scrapers is provided for dislodging accumulated debris from an associated bicycle tire and are substantially similar in construction. Therefore, only details of scraper 12 will be described.

With reference also directed to FIGS. 2 and 3, it can be seen that scraper 12 is of unitary construction and includes a planar blade 20 and a mounting member 22. It can be seen that mounting member 22 is detachably secured to frame member 16 by means of adhesive material 24. The adhesive material is provided with opposed adhesive sides for adhesion to a surface 22a of mounting member 22 as well as a portion of frame member 16.

It is to also be noted that surface 22a of mounting member 22 is contoured for substantially conforming to at least a portion of the contour of frame member 16. Typically, it is contemplated that surface 22a will be contoured generally concave so that it will conform to a cylindrical frame member as illustrated. This contour enables maximum surface area of the mounting member to be disposed adjacent to frame member 16. Also, such a contoured surface conforms to the lines of the bicycle and provides for a more streamlined structure.

As shown in FIGS. 1 and 2, scraper 12 has been positioned with mounting member 22 at a preselected location on frame member 16 so that blade 20 extends toward a front wheel 26 (its tire being indicated at 28) of the bicycle. The scraper is positioned so that an edge of blade 20 is adjacent an outer portion of the circumference of tire 28. Additionally, it is to be noted that blade 20 and mounting member 22 are constructed of plastic material and are hence relatively flexible. Thus, as can be appreciated from a consideration of FIG. 2, as tire 28 revolves in the direction of arrow A, any debris accumulated on tire 28 will strike surface 20a of blade 20 and be dislodged therefrom through abrading or scraping action. Due to the flexibility of scraper 12, as described above, blade 20 may flex somewhat as shown in dot-dash outline so that larger imbedded material may be sufficiently removed without tearing off the scraper. As shown in FIG. 2, debris is generally indicated at 30 and is shown being dislodged generally downwardly during revolution of tire 28 in the direction of arrow A.

It is to be noted that edge 20b of the blade is generally linear, as shown in FIG. 3, and is positioned so that it does not rub against the circumference of tire 28. This is important when it is realized that debris dislodging will occur when tire 28 is aligned with the longitudinal axis of bicycle 10. In other words, edge 20b must be constructed to permit free turning of the tire. Scraping or removal of debris will occur only when the bicycle is being ridden generally in a straight-forward direction.

As can also be seen from a consideration of FIG. 1, scraper 14 is positioned on frame member 18 so that debris may be dislodged from a rear wheel similar to that described for debris dislodging on the front wheel. It should also be noted that it is relatively unimportant as to the direction of mounting of mounting member 22. Specifically, instead of the mounting member facing downwardly as shown in FIGS. 1 and 2, the position of scraper 12 could be reversed so that mounting member 22 faced upwardly. The overall scraping effect of blade member 20 would be unimpaired.

Turning now to FIGS. 4-6, a second embodiment of the present invention will be described. Specifically, as shown in FIG. 4, a scraper for mounting on a fender is generally indicated at 32. Scraper 32 is mounted adjacent a forward end of fender 34 and also contemplates the provision of a unitary blade and mounting member. Similarly, a scraper could be provided on a rear fender of the bicycle. As shown in more detail in FIG. 5, scraper 32 includes a blade 36 and a mounting member generally indicated at 38. Blade 36 includes a scraping edge 40 and mounting member 38 includes first and second elements 42, 44. It is to be noted that second element 44 extends by means of a curved expanse 46 from first element 42. Additionally, second element 44 includes a surface 44a, facing toward the fender and tire contoured for substantially conforming to at least a portion of fender 34. An adhesive material 48 is positioned between contoured surface 44a and the outer surface of fender 34 for detachably mounting scraper 32 to the fender. As shown in FIG. 5, scraper 32 is appropriately mounted to fender 34 so that edge 40 is positioned adjacent to the tire without substantially contacting same. Thus, as the tire revolves in the direction of arrow B, debris will contact edge 40 and a portion of surface 36a and be dislodged from the tire. As shown in dot-dash, blade 36 may flex outwardly depending upon the size or degree of imbedding of debris material.

It is to be noted that the edge of blade 36 may be arcuately formed in order to conform with the outline of a tire. Specifically, as shown in FIG. 6, an arcuate edge 41, shown in dot-dash, may be provided because it is not necessary that the tire swing by the scraper as was set forth for the first embodiment. This is because scraper 32 is secured to fender 34 and will move simultaneously with the fender and tire as the wheel is turned.

In summary, it should be appreciated that the above-described embodiments of the present invention provide several distinct advantages. Specifically, with reference to the first embodiment, it can be seen that an extremely simple scraper is provided which may be readily mounted on either front or rear frame members of a bicycle for dislodging accumulated material from either the front or rear tires. In addition, it can be appreciated that the scraper may be constructed at low cost with relatively inexpensive materials. Furthermore, the scraper has a generally pleasing appearance because it is formed of relatively clear plastic material and has a mounting member contoured to the form of the attached frame member.

It should also be noted that there are no permanent modifications required to be made on the bicycle in order to mount the scraper. More particularly, it is not necessary to drill any of the frame members for receiving mounting screws or bolts. All that is required is the simple provision of adhesive material secured to the mounting member as well as to the frame member. Because of the extremely lightweight construction of the scraper, there is no effect on the handling or overall weight of the bicycle.

With reference to the second embodiment, it can be seen that the scraper may be readily attached to either the front or rear fenders of a bicycle and is provided with a mounting member having first and second elements for presenting an edge of the blade downwardly adjacent a tire. In addition, the first and second elements permit somewhat greater flexing of the blade preventing inadvertent dislodging of the scaper should a large piece of debris material be encountered. Also, it is to be noted that the scraper of the second embodiment is of simple construction and does not require modification of the bicycle fender.

With respect to mounting of either of the embodiments on a frame member or fender, it is only necessary to approximately eyeball the position of the scraper relative to its point of attachment making sure that the scraper's edge will be positioned adjacent to the outer surface of a tire. The scraper may then be secured in place by pressing the mounting member, with its contoured surface provided with the adhesive material, against either a frame member or fender, so that adhesion occurs. Should it be desired to remove the scraper, it is a simple matter to manually pull the blade until the adhesive material releases its grip.

While the invention has been particularly shown and described with reference to the foregoing preferred embodiments, it will be understood by those skilled in the art that other changes in form and detail may be made without departing from the spirit and scope of the invention as defined in the appended claims.

It is claimed and desired to be secured by Letters Patent:

1. A scraper for dislodging accumulated debris from a bicycle tire comprising:
   a unitary planar blade and mounting member, said mounting member being detachably secured to a frame member of the bicycle for positioning an edge of said blade adjacent a portion of the outer circumference of the tire, said mounting member being formed with a surface contoured for substantially conforming to at least a portion of said frame member's contour.

2. The scraper of claim 1 wherein said mounting member is disposed at an angle relative to said blade.

3. The scraper of claim 2 wherein adhesive material is positioned on said surface of said mounting member for securing said mounting member to said frame member.

4. The scraper of claim 1 wherein said blade and mounting member are formed of a plastic material.

5. A scraper for dislodging accumulated debris from a bicycle tire comprising:
a unitary planar blade and mounting member, said mounting member being detachably secured to a fender of the bicycle for positioning an edge of said blade adjacent a portion of the outer circumference of the tire, said mounting member being formed with a surface, facing toward the tire, contoured for substantially conforming to at least a portion of said fender's contour.

6. The scraper of claim 5 wherein said mounting member is disposed at an angle relative to said blade.

7. The scraper of claim 6 wherein said blade and mounting member are formed of a plastic material.

8. The scraper of claim 5 wherein said mounting member includes a first element disposed at an angle relative to said blade and a second element extending from said first element, said second element including a surface, facing toward the tire, contoured for substantially conforming to at least a portion of said fender's contour.

9. The scraper of claim 7 wherein adhesive material is positioned between said surface and said fender for securing said mounting member to said fender.

* * * * *